United States Patent
Kaihori

(10) Patent No.: US 8,051,286 B2
(45) Date of Patent: Nov. 1, 2011

(54) VEHICLE ANTITHEFT SYSTEM

(75) Inventor: Hiroki Kaihori, Osaka (JP)

(73) Assignee: Panasonic Corporation, Osaka (JP)

( * ) Notice: Subject to any disclaimer, the term of this patent is extended or adjusted under 35 U.S.C. 154(b) by 542 days.

(21) Appl. No.: 10/578,638

(22) PCT Filed: Oct. 19, 2005

(86) PCT No.: PCT/JP2005/019171
§ 371 (c)(1),
(2), (4) Date: May 9, 2006

(87) PCT Pub. No.: WO2006/043576
PCT Pub. Date: Apr. 27, 2006

(65) Prior Publication Data
US 2007/0067632 A1    Mar. 22, 2007

(30) Foreign Application Priority Data

Oct. 21, 2004   (JP) ................. 2004-306657

(51) Int. Cl.
*H04L 9/00* (2006.01)
*H04L 7/00* (2006.01)
(52) U.S. Cl. ............... 713/169; 726/27; 380/270
(58) Field of Classification Search ........ None
See application file for complete search history.

(56) References Cited

U.S. PATENT DOCUMENTS

| | | | | |
|---|---|---|---|---|
| 4,596,985 A | * | 6/1986 | Bongard et al. | 340/825.69 |
| 5,191,610 A | * | 3/1993 | Hill et al. | 380/262 |
| 5,708,307 A | * | 1/1998 | Iijima et al. | 307/10.5 |
| 6,008,722 A | | 12/1999 | Hirozawa et al. | |
| 6,043,752 A | * | 3/2000 | Hisada et al. | 340/5.26 |
| 6,332,572 B1 | * | 12/2001 | Yamamoto et al. | 235/382 |
| 6,335,576 B1 | | 1/2002 | Wallace | |
| 7,132,923 B2 | | 11/2006 | Yashiki et al. | |
| 7,327,227 B2 | * | 2/2008 | Ohtaki et al. | 340/426.1 |
| 2004/0056776 A1 | * | 3/2004 | Tsuji et al. | 340/825.72 |
| 2004/0064698 A1 | * | 4/2004 | Zhang | 713/169 |
| 2006/0076834 A1 | * | 4/2006 | Kamiya | 307/10.1 |
| 2006/0152348 A1 | * | 7/2006 | Ohtaki et al. | 340/426.1 |
| 2008/0122595 A1 | * | 5/2008 | Yamamichi et al. | 340/426.16 |

FOREIGN PATENT DOCUMENTS

JP    07-048966    2/1995
(Continued)

OTHER PUBLICATIONS

International Search Report for application No. PCT/JP2005/019171 dated Jan. 17, 2006.

(Continued)

*Primary Examiner* — Eleni Shiferaw
*Assistant Examiner* — Jeffery Williams
(74) *Attorney, Agent, or Firm* — RatnerPrestia

(57) ABSTRACT

A vehicle antitheft system includes an immobilizer unit and a portable unit. Each of the units includes an antenna, a communication part, a data processor, and storages. The immobilizer unit and the portable unit authenticate each other, based on a highly encrypted authentication method, using at least first data for mutual authentication. Thereafter, the first data for mutual authentication or second data for mutual authentication different from the first data for mutual authentication is stored in the storages of the immobilizer unit and the portable unit.

24 Claims, 12 Drawing Sheets

FOREIGN PATENT DOCUMENTS

| | | |
|---|---|---|
| JP | 08-040206 | 2/1996 |
| JP | 10-119723 | 5/1998 |
| JP | 10-131568 | 5/1998 |
| JP | 10-181533 | 7/1998 |
| JP | 2001-265582 A | 9/2001 |
| JP | 2003-269022 A | 9/2003 |
| JP | 2004-107959 A | 4/2004 |
| JP | 2004-143889 A | 5/2004 |

OTHER PUBLICATIONS

English translation of Form PCT/ISA/210.
Supplementary European Search Report for Applicaton No. EP 05 79 5199, Oct. 9, 2009, Panasonic Corporation.

* cited by examiner

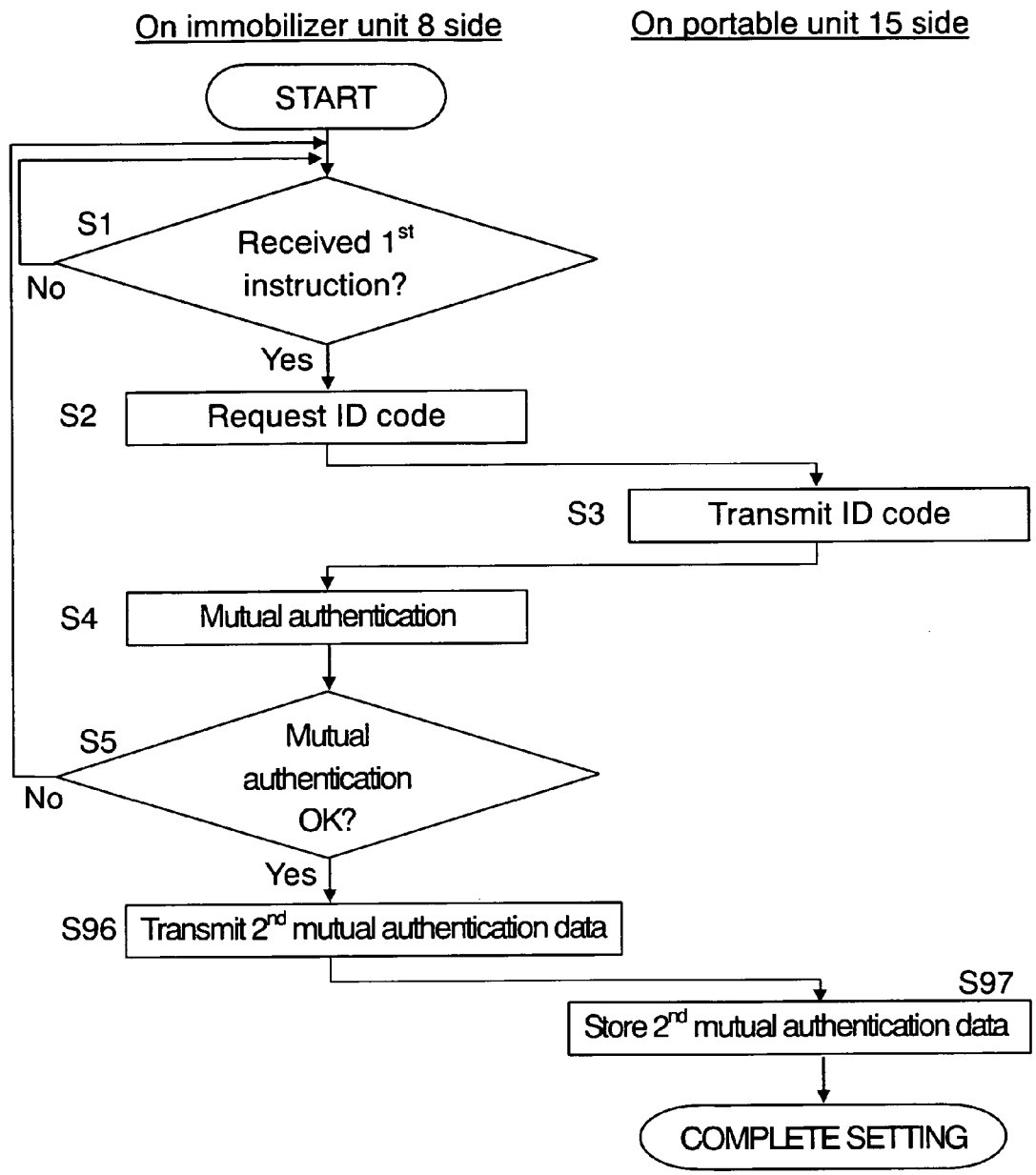

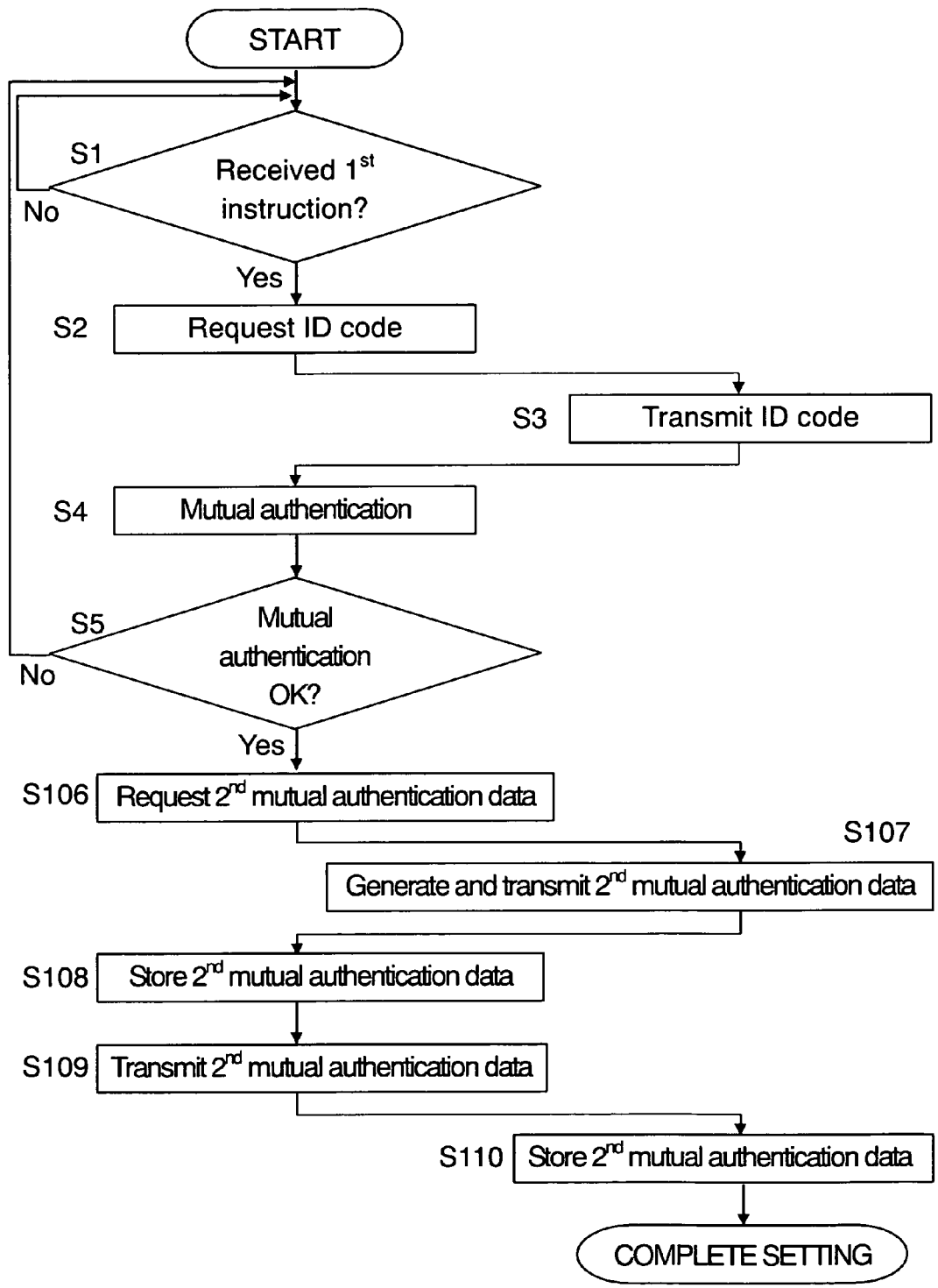

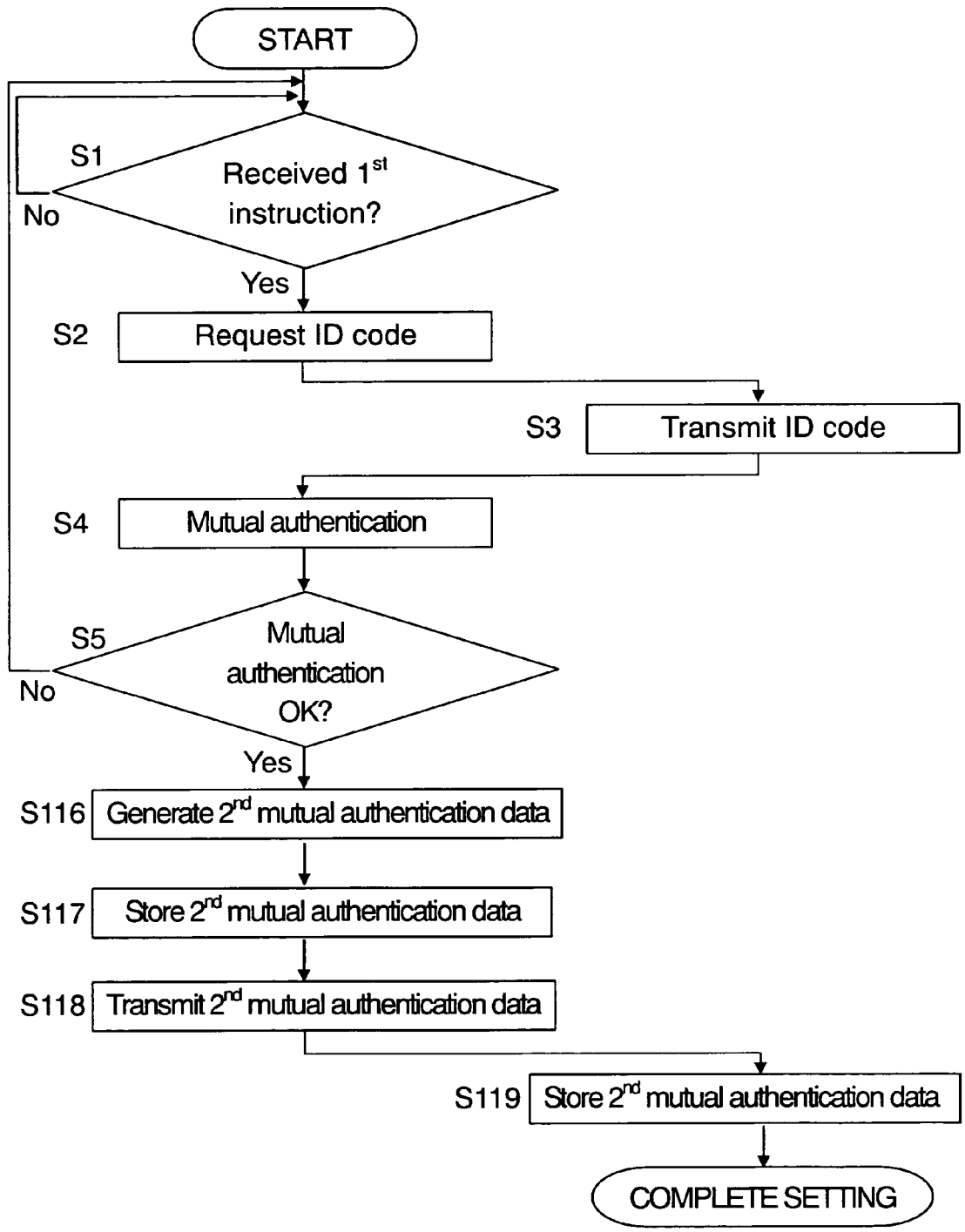

VEHICLE ANTITHEFT SYSTEM

This application is a U.S. National Phase Application of PCT International Application PCT/JP2005/019171.

TECHNICAL FIELD

The present invention relates to an antitheft system for a vehicle.

BACKGROUND ART

A vehicle antitheft system for preventing theft of a vehicle is proposed in Japanese Patent Unexamined Publication No. H08-40206, for example. This system includes an immobilizer unit incorporated in a vehicle, and a portable unit. Into a ROM provided on the immobilizer unit side, an encryption key, a password, and an ID identical to those stored in the portable unit are written, using equipment in a vehicle manufacturer's factory or a dealer. After this setting, authentication is performed between the immobilizer unit and the portable unit with a high level of security. When the immobilizer unit authenticates the portable unit, the engine of the vehicle is started.

In such a system, authentication is performed with a high level of security. However, special equipment is necessary to write the encryption key, the password, and the ID identical to those stored in the portable unit, into the ROM in the immobilizer unit.

SUMMARY OF THE INVENTION

A vehicle antitheft system of the present invention has an immobilizer unit and a portable unit. The immobilizer unit includes an information reception part, a first data processor, a first communication part, a first antenna, and first and second storages. The fist data processor is connected with the information reception part. The first communication part is connected with the first data processor. The first antenna is connected with the first communication part. The first and second storages are connected with the first data processor. The first storage stores first data for mutual authentication. The portable unit includes a second data processor, a second communication part, a second antenna, and third and forth storages. The second communication part is connected with the second data processor. The second antenna is connected with the second communication part. The third and fourth storages are connected with the second data processor. The third storage stores the first data for mutual authentication. When a first instruction is fed into the information reception part, the first data processor and the second data processor authenticate each other, via the first antenna and the second antenna, using the first data for mutual authentication stored in the first storage and the first data for mutual authentication stored in the third storage. After the completion of this mutual authentication, one of the following operations is performed:

1) The second data processor stores, in the third storage, one of the first data for mutual authentication and second data for mutual authentication different from the first data for mutual authentication. The data is stored in the fourth storage. Then, the second data processor transmits, via the second antenna, the one of the first data for mutual authentication and the second data for mutual authentication that is stored. The first data processor stores, into the second storage, the one of the first data for mutual authentication and the second data for mutual authentication that is received via the first antenna.

2) The first data processor transmits, via the first antenna, one of the first data for mutual authentication and second data for mutual authentication different from the first data for mutual authentication The data is stored in the fourth storage. The second data processor stores, in the third storage, the one of the first data for mutual authentication and the second data for mutual authentication that is received via the second antenna.

3) The second data processor generates one of data identical to the first data for mutual authentication and second data for mutual authentication different from the first data for mutual authentication, and stores the generated data in the third storage. The second data processor further transmits the data via the second antenna. The first data processor stores, in the second storage, the one of the first data for mutual authentication and the second data for mutual authentication that is received via the first antenna.

4) The first data processor generates one of data identical to the first data for mutual authentication and second data for mutual authentication different from the first data for mutual authentication, and stores the generated data in the second storage. The first data processor further transmits the data via the first antenna. The second data processor stores, in the third storage, the one of the first data for mutual authentication and the second data for mutual authentication that is received via the second antenna. In each of the cases 2), 3) and 4) described above, the fourth storage is unnecessary.

Any one of these structures allows the second storage of the immobilizer unit and the third storage of the portable unit to store the first data for mutual authentication or the second data for mutual authentication different form the first data for mutual authentication. In other words, the data for mutual authentication can be set, without special equipment connected to the portable unit or the immobilizer unit. Further, one of these structures can provide a vehicle antitheft system with a high level of security.

BRIEF DESCRIPTION OF THE DRAWINGS

FIG. 10 is a flowchart showing a procedure for setting data in an immobilizer unit and a portable unit of the vehicle antitheft system in accordance with the second exemplary embodiment.

FIG. 11 is a flowchart showing a procedure for setting data in an immobilizer unit and a portable unit of the vehicle antitheft system in accordance with the third exemplary embodiment.

FIG. 12 is a flowchart showing a procedure for setting data in an immobilizer unit and a portable unit of the vehicle antitheft system in accordance with the fourth exemplary embodiment.

REFERENCE MARKS IN THE DRAWINGS

Figure 1:
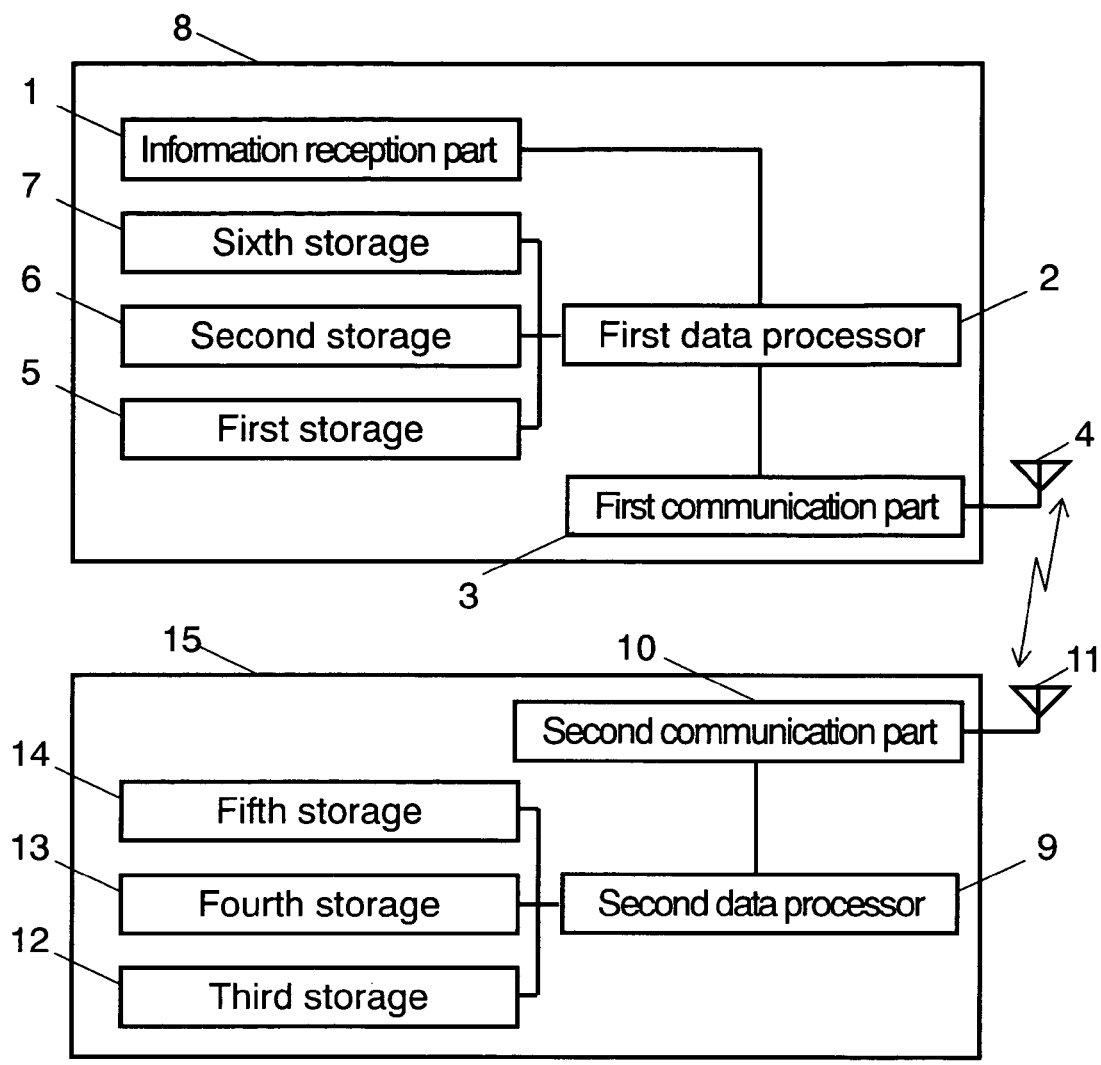
FIG. 1 is a block diagram illustrating a vehicle antitheft system in accordance with a first exemplary embodiment of the present invention.

1 Information reception part
2 First data processor
3 First communication part
4 First antenna
5 First storage
6 Second storage
7 Sixth storage
8 Immobilizer unit
9 Second data processor
10 Second communication part
11 Second antenna
12 Third storage
13 Fourth storage
14 Fifth storage
15 Portable unit

DETAILED DESCRIPTION OF PREFERRED EMBODIMENTS

A description is hereinafter provided of exemplary embodiments of the present invention, with reference to the accompanying drawings. In each of the embodiments, same elements used in the preceding embodiments thereof are denoted with the same reference marks, and the detailed description thereof may be omitted.

First Exemplary Embodiment

FIG. 1 is a block diagram illustrating a vehicle antitheft system in accordance with the first exemplary embodiment of the present invention. Immobilizer unit 8 incorporated into a vehicle, and portable unit 15 carried by a user constitute the vehicle antitheft system.

Immobilizer unit 8 has information reception part 1, first data processor (hereinafter referred to as a processor) 2, first communication part (communication part) 3, first antenna (antenna) 4, first storage (storage) 5, second storage (storage) 6, and sixth storage (storage) 7. Processor 2 is connected with information reception part 1. Communication part 3 is connected with processor 2. Antenna 4 is connected with communication part 3. Storage 5 stores first data for mutual authentication Storages 5, 6, and 7 are connected with processor 2. Although not shown, processor 2 is connected with a mechanism for locking the ignition switch for starting operation of the vehicle engine, or engine control unit.

Information reception part 1 is made of a keyboard or a switch, for example. Data processor 2 includes a CPU, for example. Each of storages 5, 6, and 7 is made of a non-volatile RAM, for example. Storage 5 can be made of a ROM.

Portable unit 15 has second data processor (hereinafter referred to as a processor) 9, second communication part (communication part) 10, second antenna (antenna) 11, third storage (storage) 12, fourth storage (storage) 13, and fifth storage (storage) 14. Communication part 10 is connected with processor 9. Antenna 11 is connected with communication part 10. Storage 12 stores data identical to the first data for mutual authentication. Storages 12, 13, and 14 are connected with processor 9.

Data processor 9 includes a CPU. Each of storages 12, 13, and 14 is made of a non-volatile RAM, for example. Storage 14 can be made of a ROM.

Figure 2:
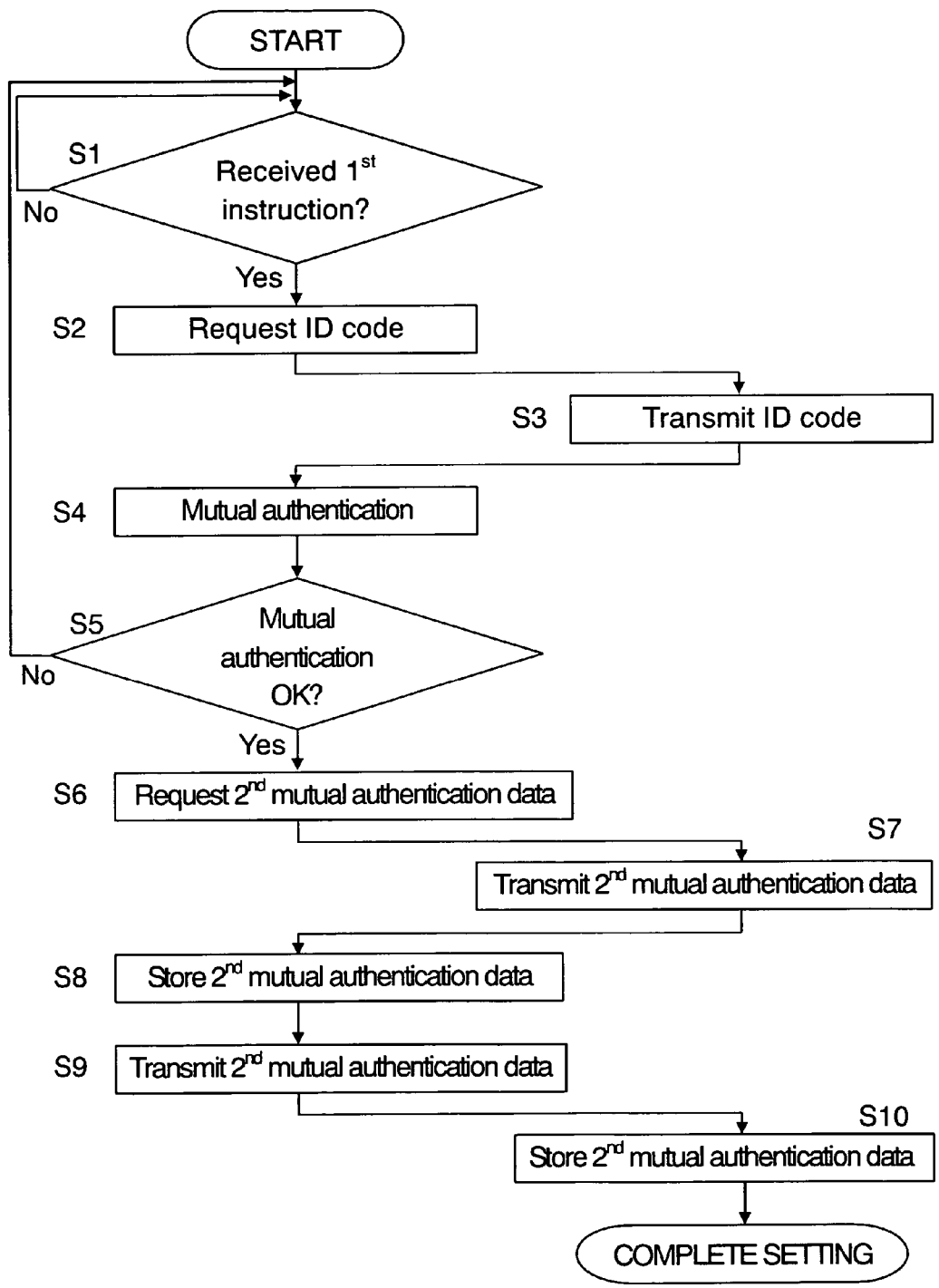
FIG. 2 is a flowchart showing a procedure for setting data in an immobilizer unit and a portable unit of the vehicle antitheft system shown in FIG. 1.
Figure 3:
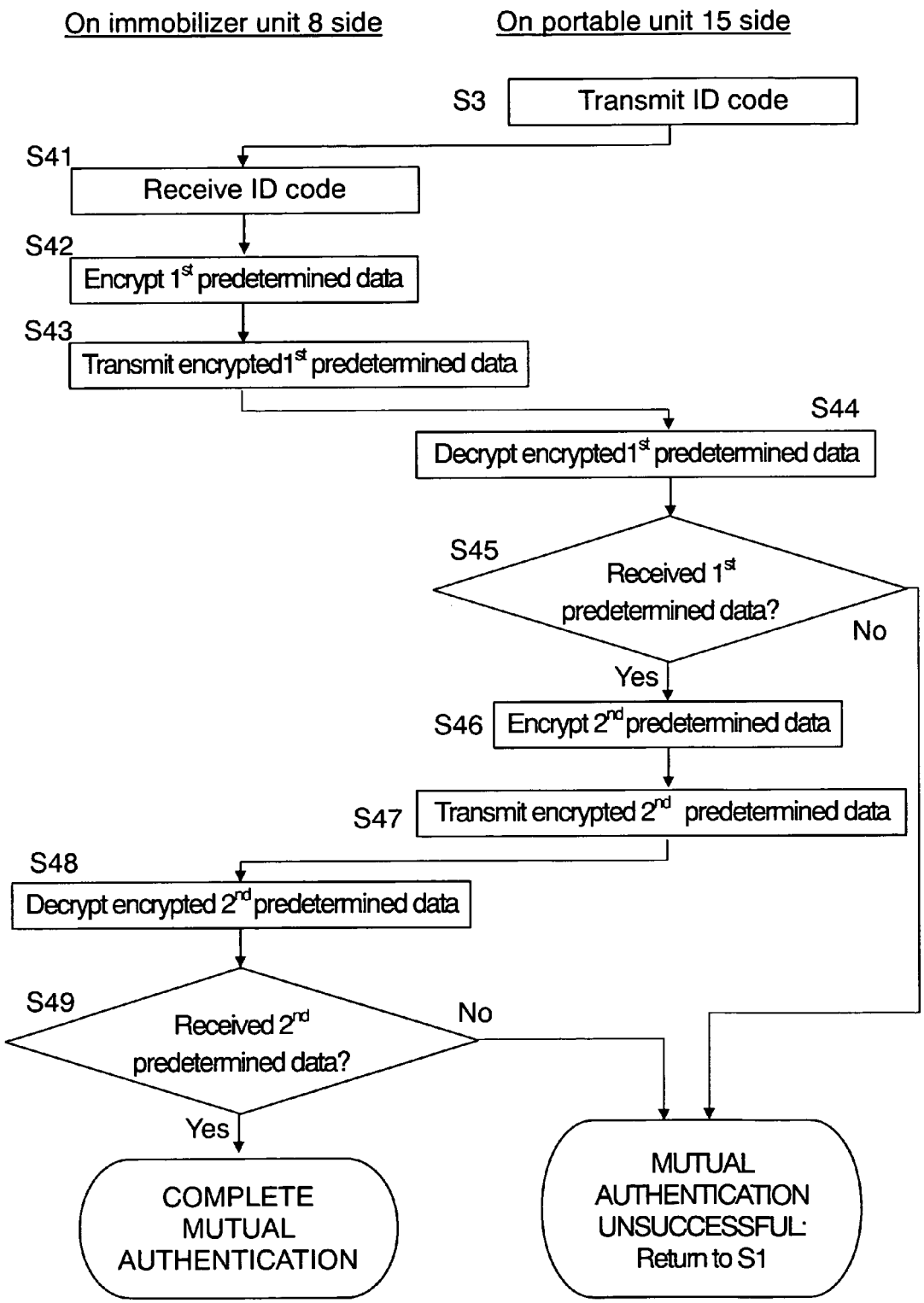
FIG. 3 is a flowchart showing a detailed procedure for mutual authentication shown in the flowchart of FIG. 2.

A description is provided of the operation of the vehicle antitheft system structured as above, with reference to FIGS. 2 and 3. FIGS. 2 and 3 are flowcharts for illustrating a procedure for setting data and a procedure for deleting the data, respectively. First, a description is provided of the procedure for setting data.

In S1, processor 2 determines whether or not a first instruction is fed into information reception part 1. If the first instruction is fed, the process goes to S2. The first instruction is made of a predetermined operation that is not performed normally, such as opening and closing a door of the vehicle three times a second. The first instruction is an instruction for setting portable unit 15 for immobilizer unit 8.

In S2, via communication part 3 and antenna 4, processor 2 transmits a request for an ID code to processor 9, by way of antenna 11 and communication part 10 of portable unit 15. Upon receipt of the request for the ID code, processor 9 transmits the ID code stored in storage 14, via communication part 10 and antenna 11, to processor 2, by way of antenna 4 and communication part 3 of immobilizer unit 8, in S3. Upon receipt of the ID code, processor 2 stores the received ID code in storage 7. Then, in S4, processors 2 and 9 authenticate each other, based on a highly encrypted authentication method, via antenna 4 and antenna 11. At this time, the first data for mutual authentication stored in storages 5 and 12, and the ID code stored in storage 14 are used. If processors 2 and 9 authenticate each other, the process goes to S6. If the mutual authentication is unsuccessful the process returns to S1.

Now, an example of mutual authentication in steps S4 and S5 is described with reference to a flowchart of FIG. 3. When portable unit 15 transmits the ID code in S3, processor 2 receives the ID code via communication part 3 and antenna 4 (S41). Using this ID code and the first data for mutual authentication stored in storage 5, processor 2 encrypts first predetermined data (S42). This first predetermined data is data for mutual authentication with a high level of security, and is not specifically significant data. The first predetermined data is preliminary stored in areas in storages 6 and 12 other than the areas for storing the first and second data for mutual authentication. Via communication part 3 and antenna 4, processor 2 transmits the encrypted first predetermined data to processor 9, by way of antenna 11 and communication part (S43).

Upon receipt of the encrypted first predetermined data, processor 9 decrypts the encrypted first predetermined data received, using the first data for mutual authentication stored in storage 12 and the ID code stored in storage 14 (S44). Then, processor 9 determines whether or not the decrypted data is the first predetermined data in comparison with the data in storage 12 (S45). If the data is the first predetermined data, the process goes to S46. If the data is not the first predetermined data, mutual authentication is unsuccessful and the process returns to S1 of FIG. 2. In S46, processor 9 encrypts second predetermined data, using the first data for mutual authentication stored in storage 12. Then, processor 9 transmits this data via communication part 10 and antenna 11 (S47). The second predetermined data is also data for mutual authentication with a high level of security, and is not specifically significant data. The second predetermined data is preliminarily stored in areas in storages 6 and 12 other than the areas for storing the first and the second data for mutual authentication and the areas for storing the first predetermined data.

Processor 2 receives, via communication part 3 and antenna 4, the encrypted second predetermined data, and decrypts the data using the first data for mutual authentication stored in storage 5 (S48). Then, processor 2 determines whether or not the decrypted data is the second predetermined data in comparison with the data in storage 6 (S49). If the data is the second predetermined data, mutual authentication is completed. If the data is not the second predetermined data, mutual authentication is unsuccessful and the process returns to S1 of FIG. 2. As described above, mutual authentication is completed by checking the first and the second predetermined data in both units together.

After mutual authentication between immobilizer unit 8 and portable unit 15 is completed, via communication part 3 and antenna 4, processor 2 requests the second data for mutual authentication from processor 9, by way of antenna 11 and communication part 10 (S6). The second data for mutual authentication is different from the fist data for mutual authentication. The second data for mutual authentication is stored in storage 13.

Next, in response to this request, via communication part 10 and antenna 11, processor 9 transmits the second data for mutual authentication to processor 2, by way of antenna 4 and communication part 3 (S7). Upon receipt of the second data for mutual authentication, processor 2 stores the second data for mutual authentication in storage 6 (S8). Further, via communication part 3 and antenna 4, processor 2 transmits data identical to the second data for mutual authentication stored in storage 6 to processor 9, by way of antenna 11 and communication part 10 (S9). Finally, processor 9 stores the second data for mutual authentication in storage 12 (S10). By these steps, a series of setting procedure is completed. By storing the identical second data for mutual authentication in storages 6 and 12, portable unit 15 is set for immobilizer unit 8.

Figure 4:
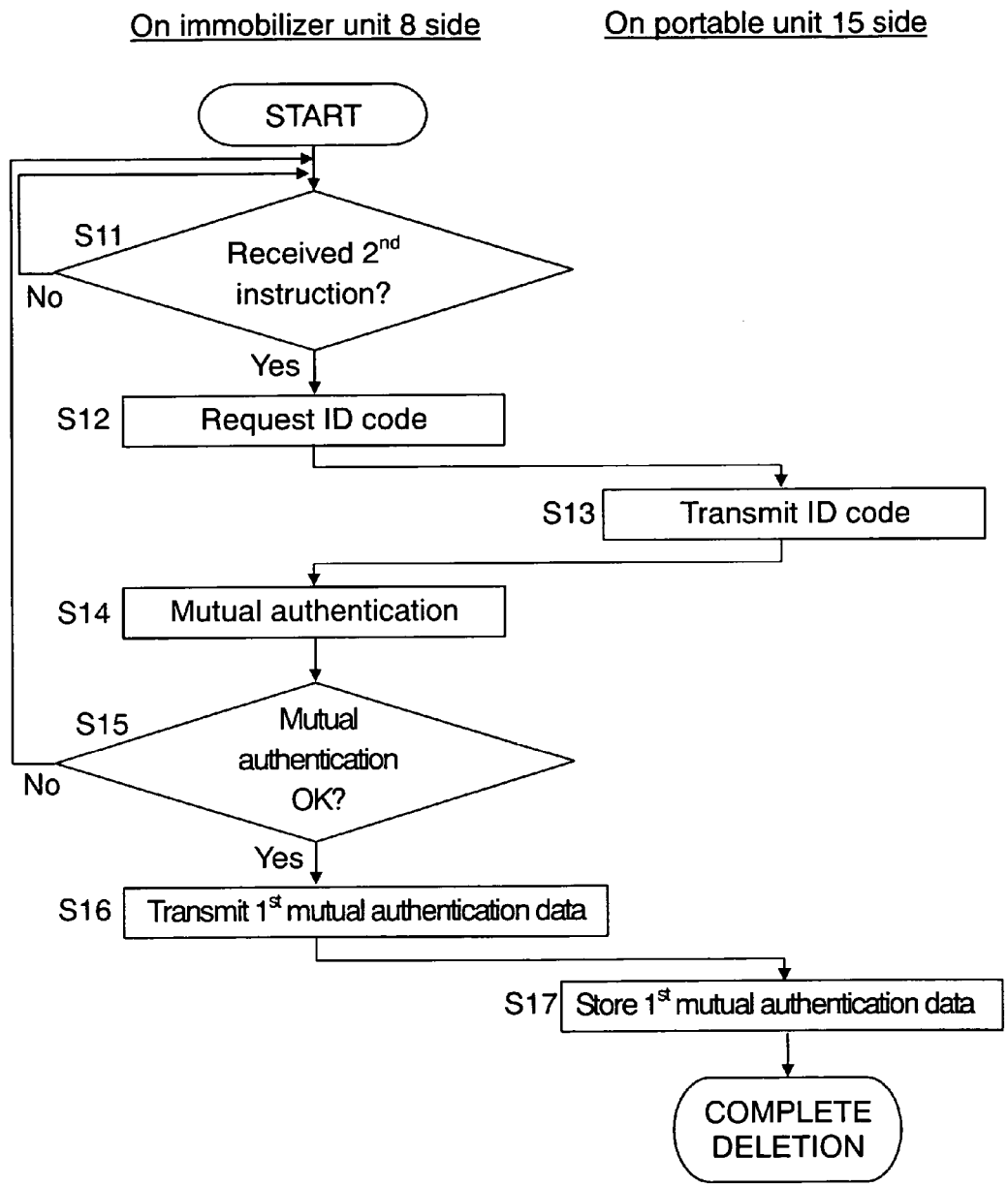
FIG. 4 is a flowchart showing a procedure for deleting the data in the immobilizer unit and the portable unit of the vehicle antitheft system shown in FIG. 1.

Next, a description is provided of a procedure for deleting at least one of the second data for mutual authentication stored in storages 6 and 12 by the above setting procedure, and for canceling the setting of portable unit 15, with reference to FIG. 4.

First, in S11 through 15, mutual authentication is performed. In S11, processor 2 determines whether or not a second instruction is fed into information reception part 1. If the second instruction is fed, the process goes to S12. The second instruction is made of a predetermined operation that is not performed normally, such as turning a vehicle ignition key to and fro between ACC position and OFF position three times a second. The second instruction is an instruction for canceling the setting of portable unit 15 for immobilizer unit 8.

The operations in S12 and 13 are the same as those in S2 and S3. In S14, processors 2 and 9 authenticate each other via antenna 4 and antenna 11, based on a highly encrypted authentication system. At this time, the second data for mutual authentication and the first and second predetermined data stored in respective storages 6 and 12, and the ID code stored in storage 14 are used. If processors 2 and 9 authenticate each other, the process goes to S16. If the mutual authentication is unsuccessful, the process returns to S11. The details of the mutual authentication in S14 and S15 are similar to those in S4 and S5, thus a detailed description thereof is omitted.

Upon completion of mutual authentication between immobilizer unit 8 and portable unit 15, via communication part 3 and antenna 4, processor 2 transmits the first data for mutual authentication stored in storage 5, to processor 9, by way of antenna 11 and communication part 10 (S16). Processor 9 stores the first data for mutual authentication in storage 12 (S17). In other words, the second data for mutual authentication stored in storage 12 is overwritten with the first data for mutual authentication These steps make the data stored in respective storages 6 and 12 not identical to each other, thus completing a series of deleting procedure.

Figure 5:
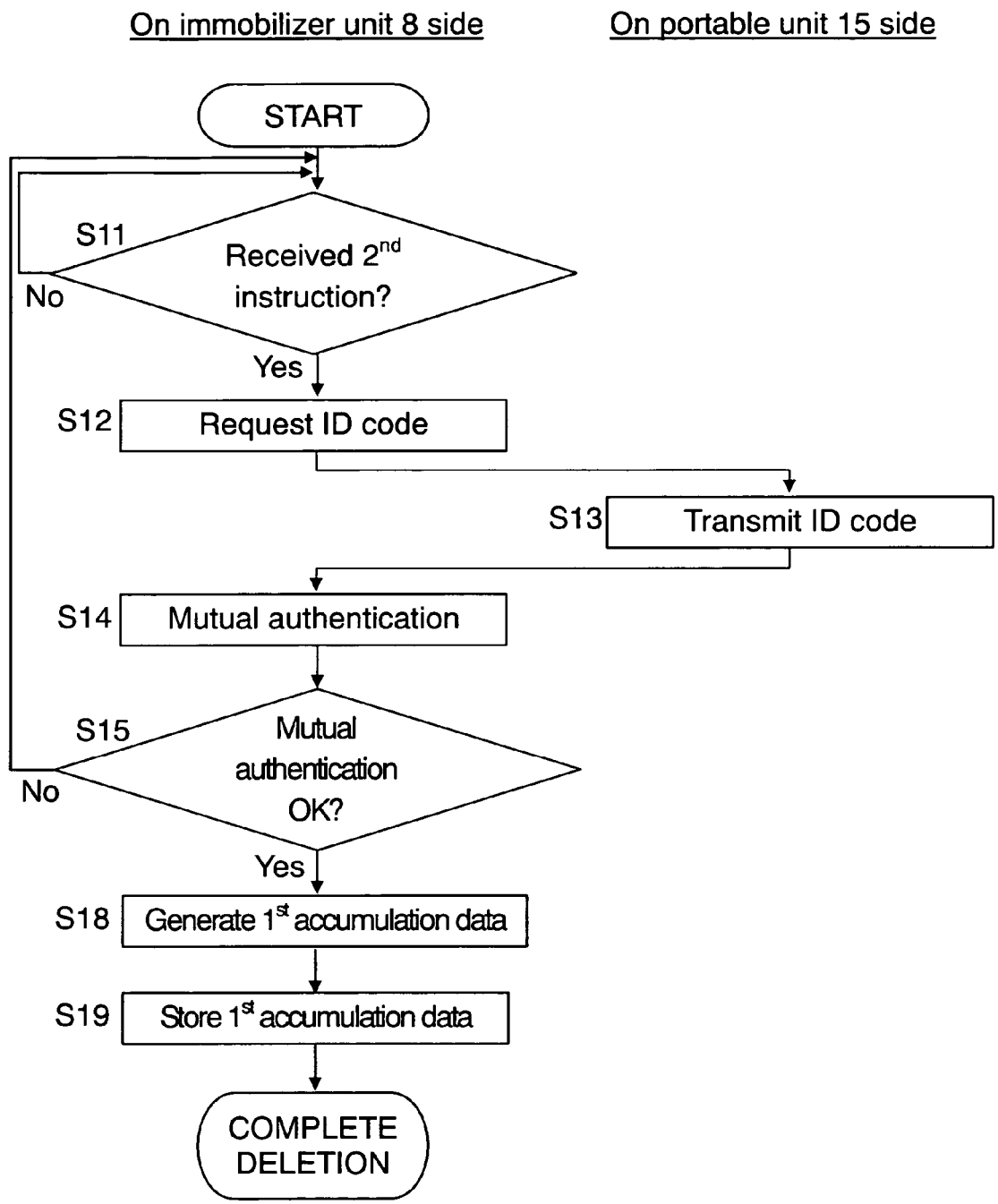
FIG. 5 is a flowchart showing another procedure for deleting the data in the immobilizer unit and the portable unit of the vehicle antitheft system shown in FIG. 1.

Instead of steps S16 and S17, a process can be applied as shown in a flowchart in FIG. 5. That is to say, after completion of mutual authentication between immobilizer unit 8 and portable unit 15, processor 2 generates first accumulation data different from the first data for mutual authentication (S18), and stores the first accumulation data in storage 6 (S19). Alternatively, processor 9 may generate the first accumulation data in S18 and store the first accumulation data in storage 12 in S19. Also this procedure makes the data stored in respective storages 6 and 12 not identical to each other, thus completing a series of deleting procedure.

Figure 6:
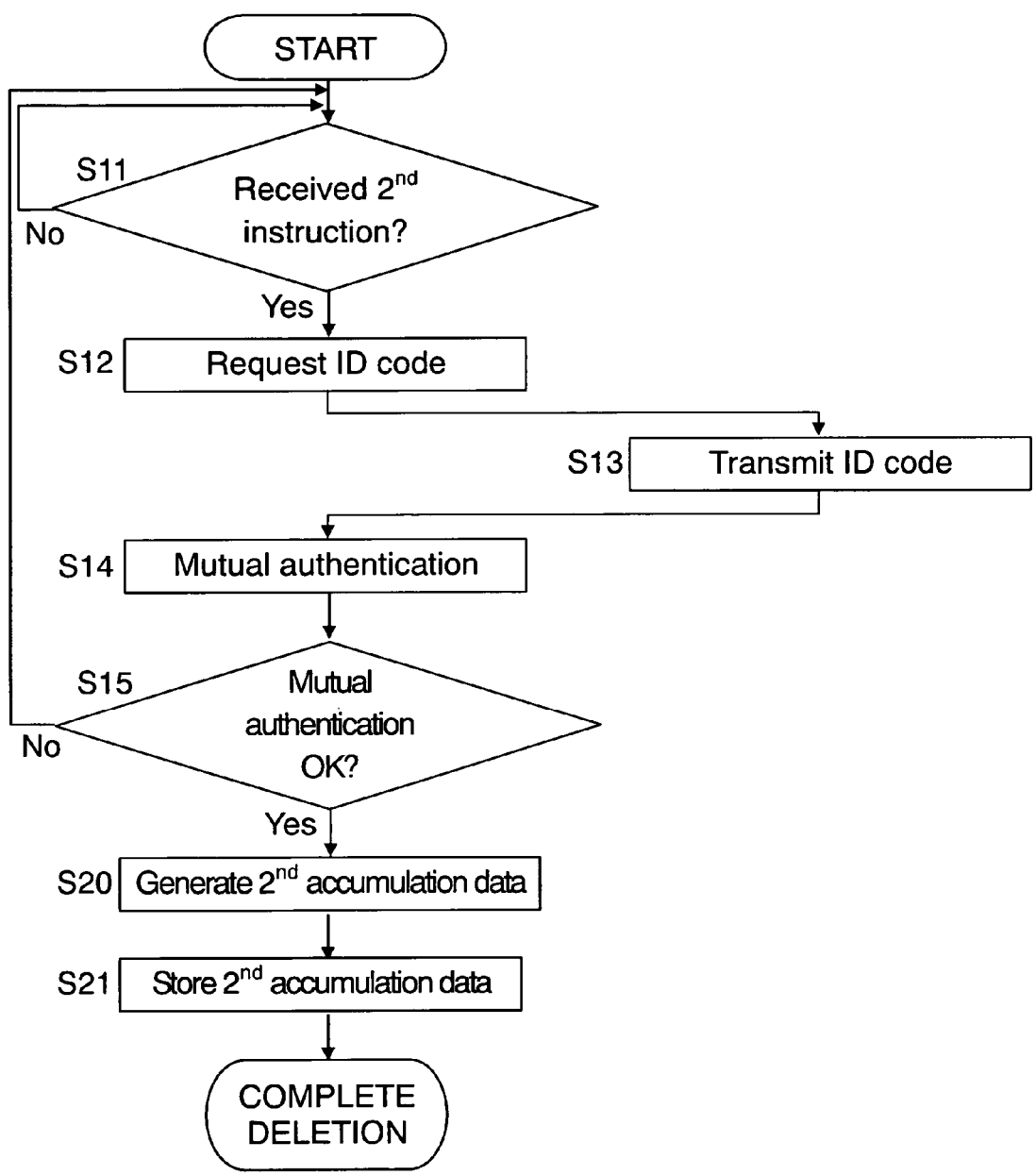
FIG. 6 is a flowchart showing still another procedure for deleting the data in the immobilizer unit and the portable unit of the vehicle antitheft system shown in FIG. 1.

The above-mentioned description is according to a case of using the second data for mutual authentication different from the first data for mutual authentication as the data stored in storage 13. However, data identical to the first data for mutual authentication can be used. A description is provided of the deleting procedure in such a case, with reference to a flowchart of FIG. 6.

Figure 7:
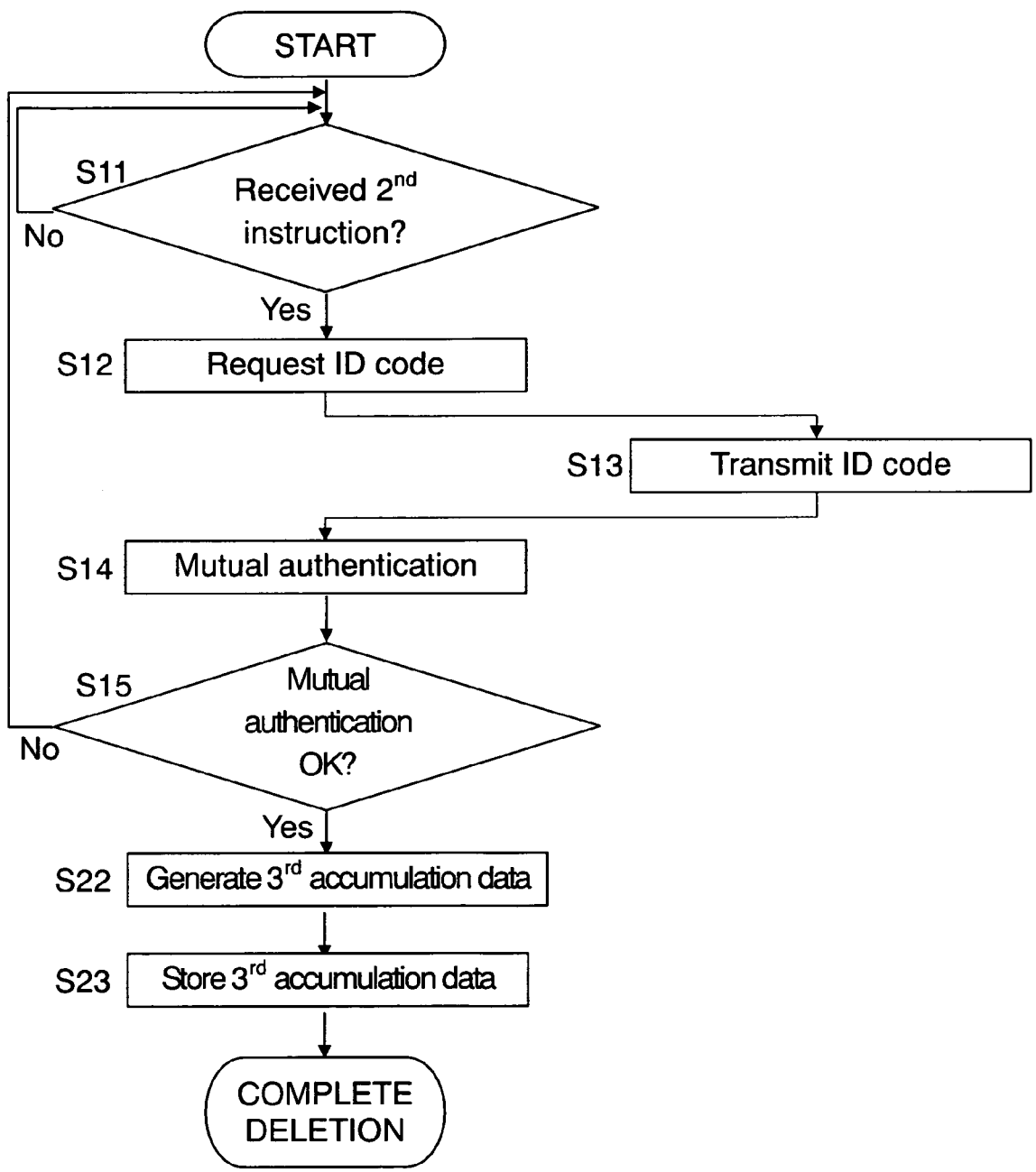
FIG. 7 is a flowchart showing yet another procedure for deleting the data in the immobilizer unit and the portable unit of the vehicle antitheft system shown in FIG. 1.

When a second instruction is fed into information reception part 1 and the mutual authentication is completed, processor 2 generates second accumulation data different from the first mutual authentication data (S20). Then, the second accumulation data is stored in storage 6 (S21). These steps can complete a series of deleting procedure. Alternatively, processor 9 may generate the second accumulation data different from the first data for mutual authentication and store the second accumulation data in storage 12. Also by the procedure shown in a flowchart of FIG. 7, the setting can be deleted. That is to say, upon input of the second instruction into information reception part 1 and completion of the mutual authentication, processor 2 generates third accumulation data different from the ID code stored in storage 6 (S23). Then, processor 2 stores the third accumulation data into storage 7. These steps make the ID codes in immobilizer unit 8 and portable unit different from each other, and the mutual authentication which will be described later is not established.

Any one of these structures allow the mutual authentication data to be set or deleted without any special unit connected to portable unit 15 or immobilizer unit 8. Any one of these structures can realize a vehicle antitheft system with a high level of security. Further, preliminary storing necessary data (the second data for mutual authentication) in storage 13 allows data to be set in storages 6 and 12 more promptly after mutual authentication.

Figure 8:
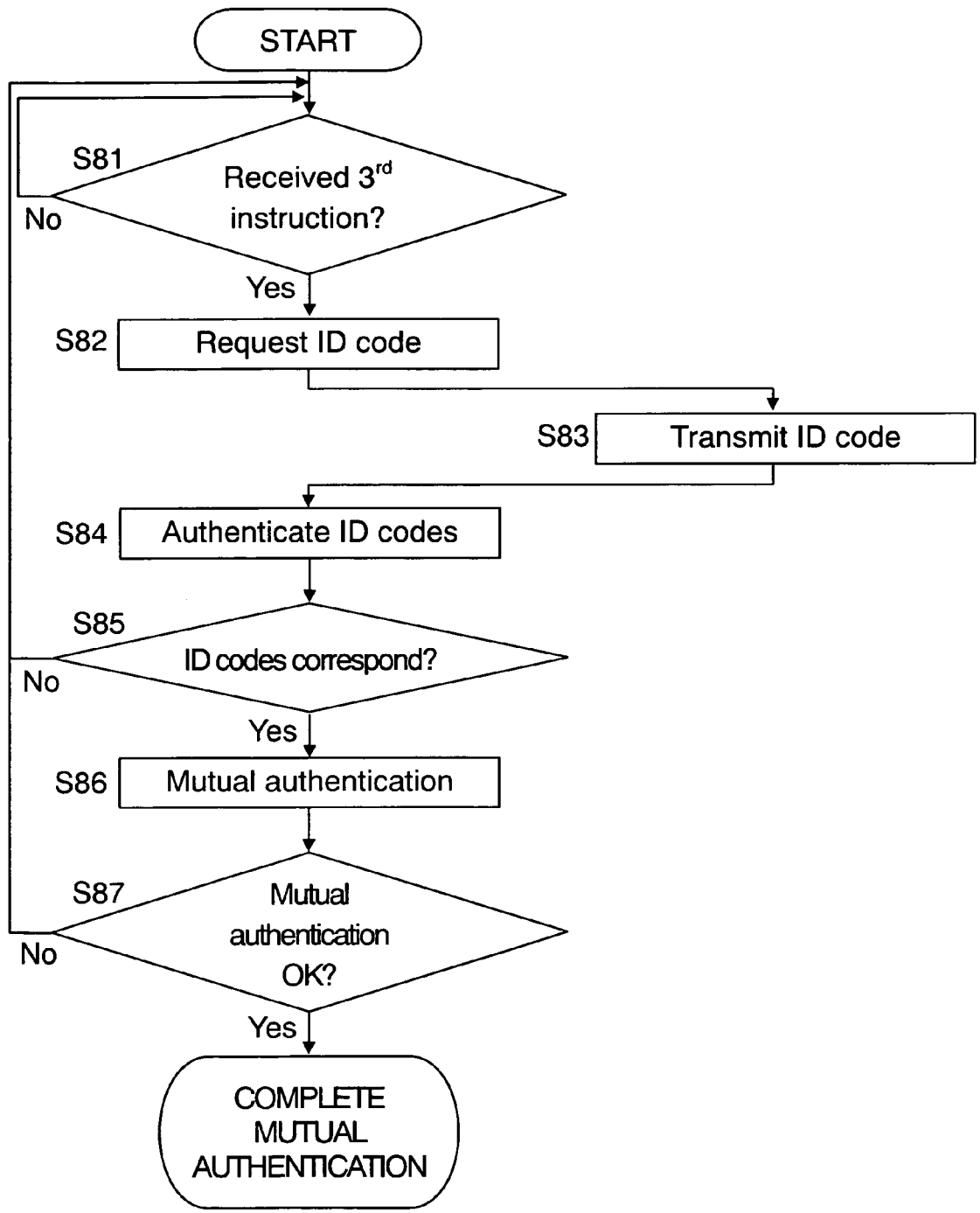
FIG. 8 is a flowchart showing a procedure for mutual authentication between the immobilizer unit and the portable unit of the vehicle antitheft system shown in FIG. 1.

Next, a description is provided of a mutual authentication made between portable unit 15 and immobilizer unit 8 to allow a user to start operation of the engine of a vehicle, with reference to a flowchart of FIG. 8.

First, in S81, processor 2 determines whether or not a third instruction is fed into information reception part 1. When the instruction is fed, the process goes to S82. The third instruction is made of a predetermined normal operation, such as inserting a mechanical key into the ignition key cylinder of the vehicle and turning the key to the engine start position. The third instruction is an instruction for making immobilizer unit 8 authenticate portable unit 15.

In S82, via communication part 3 and antenna 4, processor 2 transmits a request for an ID code from processor 9, by way of antenna 11 and communication part 10 of portable unit 15. Upon receipt of the request for the ID code, in S83, via communication part 10 and antenna 11, processor 9 transmits the ID code stored in storage 14 to processor 2, by way of antenna 4 and communication part 3 on the side of immobilizer unit 8. Upon receipt of the ID code, processor 2 compares the ID code stored in storage 7 with the received ID code for authentication (S84). If the respective ID codes are identical to each other, the process goes to S86. If the respective ID codes are not identical to each other, the process returns to S81. Then, in S86 and S87, processors 2 and 9 mutually authenticate each other, based on a highly encrypted authentication method, via antennas 4 and 11. At this time, the second data for mutual authentication and the first and the second predetermined data stored in respective storages 6 and 12 are used. If processors 2 and 9 authenticate each other, the mutual authentication is completed. If the mutual authentication is unsuccessful, the process returns to S81. Because the details of the mutual authentication in S86 and S87 are similar to those of S4 and S5, the detailed description thereof is omitted.

In the above description, an ID code is stored in storage 14 provided in portable unit 15, as an example. However, the structured is not limited to this example, and it is possible to use no ID codes.

In the above description, immobilizer unit 8 and portable unit 15 form a one-for-one pair, and storage 13 provided in portable unit 15 stores one kind of second data for mutual authentication different from the first data for mutual authentication. However, the structure is not limited to this example. It is possible to use a plurality of portable units and the portable units store a plurality of kinds of data each different from the first data for mutual authentication in each storage 13. When portable units having stored different kinds of data are used, different kinds of data corresponding to the respective kinds of data can be stored in storage 6 in immobilizer unit 8.

In other words, storage 13 of each portable unit 15 stores only one kind of data different from the first data for mutual authentication. The kinds of the data vary in respective portable units 15. Storage 6 in immobilizer unit 8 stores each kind of the data independently. Such a structure can also be realized.

Second Exemplary Embodiment

Figure 9:
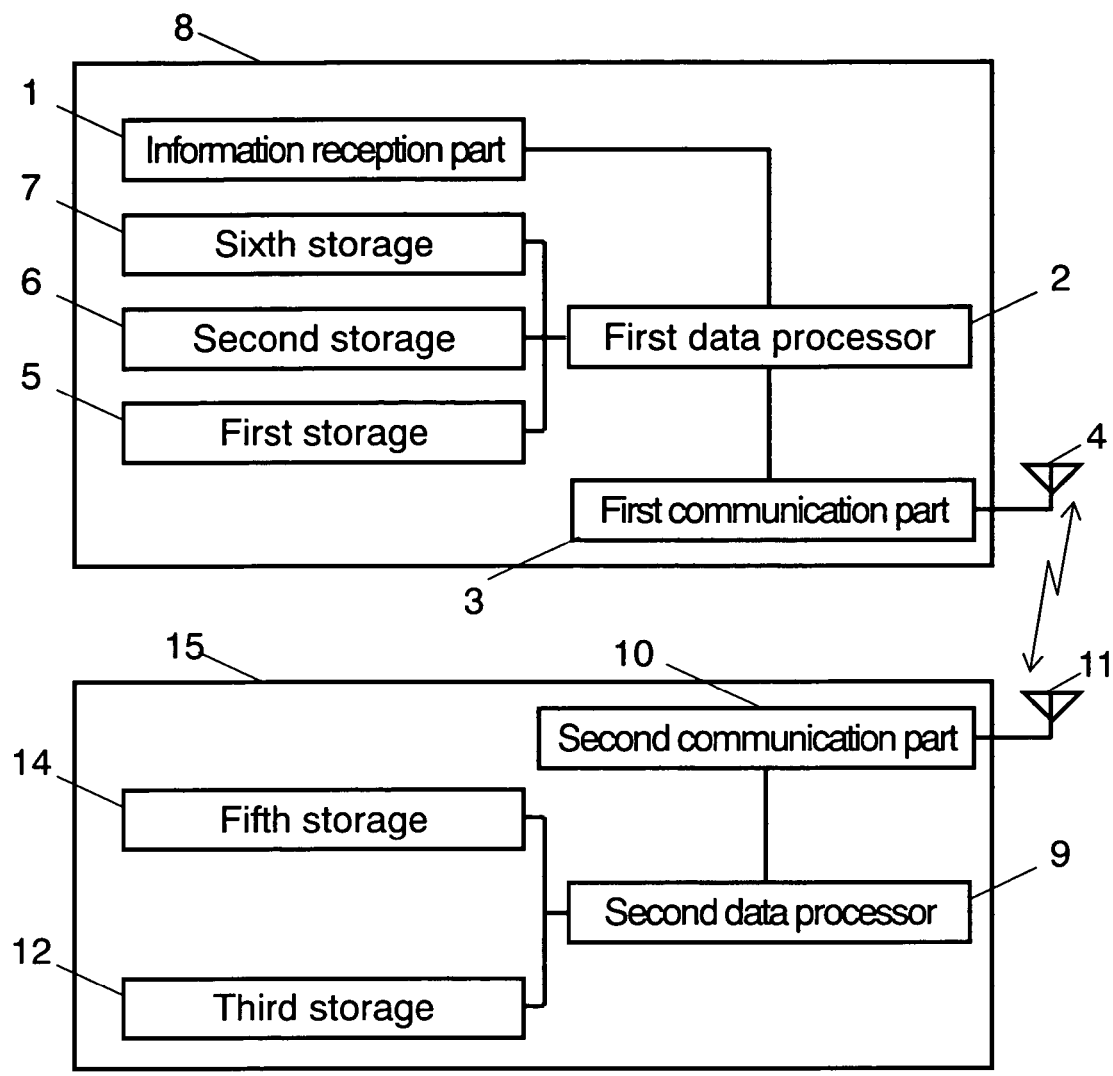
FIG. 9 is a block diagram illustrating a vehicle antitheft system in accordance with second through fourth exemplary embodiments of the present invention.

FIG. 9 is a block diagram illustrating a vehicle antitheft system in accordance with the second exemplary embodiment of the present invention. FIG. 10 is a flowchart showing a procedure for setting an immobilizer unit and a portable unit of the vehicle antitheft system of this embodiment. This embodiment is characterized in that storage 13 is omitted from portable unit 15 of FIG. 1. Only the characteristic operational steps based on this structure are detailed with reference to FIG. 10.

Storage 6 preliminarily stores second data for mutual authentication different from first data for mutual authentication stored in storage 5. In other words, the second data for mutual authentication stored in storage 13 in the first embodiment is stored in storage 6.

Upon completion of mutual authentication between immobilizer unit 8 and portable unit 15 in S5, via communication part 3 and antenna 4, processor 2 transmits the second data for mutual authentication in storage 6 to processor 9, by way of antenna 11 and communication part 10 (S96). Processor 9 stores the second data for mutual authentication in storage 12 (S97). By these steps, a series of setting procedure is completed.

In the above description, the data stored in storage 6 is the second data for mutual authentication different from the first data for mutual authentication. The data stored in storage 6 may be the first data for mutual authentication, other than the second data.

Also this structure allows the data for mutual authentication to be set without any special equipment connected to portable unit 15 or immobilizer unit 8. This structure can provide a vehicle antitheft system with a high level of security. Further, storing the necessary data in storage 6 allows data in storage 12 to be set more promptly after mutual authentication.

Third Exemplary Embodiment

The block diagram of a vehicle antitheft system of this embodiment is similar to that of the second embodiment. Hereinafter, a description is provided only of characteristic operational steps different from those of the second embodiment, with reference to a flowchart of FIG. 11.

Upon completion of mutual authentication between immobilizer unit 8 and portable unit 15 in S5, via communication part 3 and antenna 4, processor 2 requests processor 9 to generate second data for mutual authentication different from the first data for mutual authentication, by way of antenna 11 and communication part 10 (S106). In response to this request, processor 9 generates the second data for mutual authentication (S107). That is to say, storage 13 preliminary stores the second data for mutual authentication in the first embodiment, and in the second embodiment, storage 6 preliminary stores the second data for mutual authentication. In contrast, in this embodiment, processor 9 generates the second data for mutual authentication after the mutual authentication.

Via communication part 10 and antenna 11, processor 9 transmits the second data for mutual authentication to processor 2, by way of antenna 4 and communication part 3 (S107). Upon receipt of the second data for mutual authentication, processor 2 stores the second data for mutual authentication into storage 6 (S108). Further, via communication part 3 and antenna 4, processor 2 transmits data identical to the second data for mutual authentication stored in storage 6 to processor 9, by way of antenna 11 and communication part 10 (S109). Processor 9 stores the second data for mutual authentication in storage 12 (S110). By these steps, a series of setting procedure is completed.

This structure allows the data for mutual authentication to be set without any special equipment connected to portable unit 15 or immobilizer unit 8. This structure can provide a vehicle antitheft system with a high level of security. Further, because processor 9 generates the data to be stored in storages 6 and 12 after the mutual authentication, a storage for storing the data is unnecessary.

Fourth Exemplary Embodiment

The block diagram of a vehicle antitheft system of this embodiment is similar to that of the second embodiment. Hereinafter, a description is provided only of characteristic operational steps different from those of the second and third embodiments, with reference to a flowchart of FIG. 12.

Upon completion of mutual authentication between immobilizer unit 8 and portable unit 15 in S5, processor 2 generates second data for mutual authentication different from the first data for mutual authentication (S116). Processor 2 stores the second data for mutual authentication in storage 6 (S117), and via communication part 3 and antenna 4, transmits the second data to processor 9, by way of antenna 11 and communication part 10 (S118). Processor 9 stores the second data for mutual authentication in storage 12 (S119). By these steps, a series of setting procedure is completed.

Also this structure allows the mutual authentication data to be set without any special equipment connected to portable unit 15 or immobilizer unit 8. This structure can provide a vehicle antitheft system with a high level of security. Further, because processor 2 generates the data to be stored in storages 6 and 12 after the mutual authentication, a storage for storing the data is unnecessary.

In each of the second through fourth exemplary embodiments, the procedure for deleting the data for mutual authentication, and the structure in which storage 6 of immobilizer unit 8 stores a plurality kinds of data for mutual authentication corresponding to a plurality of portable units 15 are similar to those of the first exemplary embodiment. Thus, descriptions thereof are omitted.

The power of portable unit 15 is generally supplied by transmission from immobilizer unit 8. For this reason, in each of the exemplary embodiments, information reception part 1 for receiving input instructions is provided in immobilizer unit 8. However, the structure is not limited to this. The system can be structured so that portable unit 15 has information reception part 1 including input devices, such as a switch, and processor 9 transmits the input instructions, via communication part 10 and antenna 11, to processor 2, by way of antenna 4 and communication part 3. In this case, it is necessary to supply power to portable unit 15 by a battery or the like.

INDUSTRIAL APPLICABILITY

A vehicle antitheft system of the present invention is capable of setting or deleting data for mutual authentication without any special equipment connected a portable unit or immobilizer unit thereof. This system is useful as a vehicle antitheft system having a high level of security also as a vehicle system.

The invention claimed is:

1. A vehicle antitheft system comprising:
an immobilizer unit including:
a first data processor;
a memory storing a first set of computer instructions;
a first communication part connected with the first data processor;
a first antenna connected with the first communication part;
a first storage connected with the first data processor, the first storage preliminarily storing first data for mutual authentication; and
a second storage connected with the first data processor;
the immobilizer unit further includes an information reception part connected with the first data processor; and
a portable unit including:
a second data processor;
a memory storing a second set of computer instructions;
a second communication part connected with the second data processor;
a second antenna connected with the second communication part;
a third storage connected with the second data processor, the third storage preliminarily storing the first data for mutual authentication; and
a fourth storage connected with the second data processor, the fourth storage preliminarily storing second data for mutual authentication different from the first data for mutual authentication;
wherein the first data processor executes the first set of computer instructions and the second data processor executes the second set of computer instructions to perform the following functions comprising:
when a first instruction is fed into the information reception part, the first data processor and the second data processor authenticate each other by an authentication comprising: (1) the first data processor transmitting via the first antenna an encrypted data based on the first data for mutual authentication stored in the first storage and (2) the second data processor receiving the encrypted data via the second antenna, decrypting the encrypted data and comparing the decrypted data to the first data for mutual authentication stored in the third storage; and
the first data processor and the second data processor, responsive to the authentication between the first data processor and the second data processor, interchange the second data for mutual authentication to set the portable unit for the immobilizer unit in a way comprising: 1) the second data processor transmitting the second data for mutual authentication stored in the fourth storage via the second antenna, 2) the first data processor further storing, into the second storage, the second data for mutual authentication received via the first antenna and transmitting the second data for mutual authentication stored in the second storage via the first antenna, and 3) the second data processor further storing, into the third storage, the second data for mutual authentication received via the second antenna.

2. The vehicle antitheft system according to claim 1, wherein, upon input of a second instruction into the information reception part, when both of data stored in the second storage and the third storage are the second data for mutual authentication, either the first data processor generates and stores into the second storage first accumulation data different from the second data for mutual authentication, or the second data processor generates and stores into the third storage the first accumulation data; and
when both of data stored in the second storage and the third storage are identical to the first data for mutual authentication, either the first data processor generates and stores into the second storage second accumulation data different from the first data for mutual authentication, or the second data processor generates and stores into the third storage second accumulation data different from the first data for mutual authentication.

3. The vehicle antitheft system according to claim 1, wherein, upon input of a second instruction into the information reception part, when both of data stored in the second storage and the third storage are the second data for mutual authentication, the first data processor transmits the first data for mutual authentication stored in the first storage via the first antenna, and the second data processor stores, into the third storage, the first data for mutual authentication received via the second antenna; and
when both of data stored in the second storage and the third storage are identical to the first data for mutual authentication, either the first data processor generates and stores into the second storage second accumulation data different from the first data for mutual authentication, or the second data processor generates and stores into the third storage second accumulation data different from the first data for mutual authentication.

4. The vehicle antitheft system according to claim 1, wherein the portable unit further has a fifth storage preliminarily storing an ID code, and the first data processor and the second data processor authenticate each other also using the ID code.

5. The vehicle antitheft system according to claim 4, wherein the immobilizer unit further has a sixth storage, the second data processor transmits, via the second antenna, the ID code stored in the fifth storage, and the first data processor stores, into the sixth storage, the ID code received via the first antenna.

6. The vehicle antitheft system according to claim 5, wherein upon input of a second instruction into the information reception part, the first data processor generates third accumulation data different from the ID code stored in the sixth storage, and stores the third accumulation data into the sixth storage.

7. A vehicle antitheft system comprising:
   an immobilizer unit including:
      a first data processor;
      a memory storing a first set of computer instructions:
      a first communication part connected with the first data processor;
      a first antenna connected with the first communication part;
      a first storage connected with the first data processor, the first storage preliminarily storing first data for mutual authentication; and
      a second storage connected with the first data processor, the second storage preliminarily storing second data for mutual authentication different from the first data for mutual authentication; and
      the immobilizer unit further includes an information reception part connected with the first data processor; and
   a portable unit including:
      a second data processor;
      a memory storing a second set of computer instructions;
      a second communication part connected with the second data processor;
      a second antenna connected with the second communication part; and
      a third storage connected with the second data processor, the third storage preliminarily storing the first data for mutual authentication;
   wherein the first data processor executes the first set of computer instructions and the second data processor executes the second set of computer instructions to perform the following functions comprising:
      when a first instruction is fed into the information reception part, the first data processor and the second data processor authenticate each other by an authentication comprising: (1) the first data processor transmitting via the first antenna an encrypted data based on the first data for mutual authentication stored in the first storage and (2) the second data processor receiving the encrypted data via the second antenna, decrypting the encrypted data and comparing the decrypted data to the first data for mutual authentication stored in the third storage; and
      the first data processor and the second data processor, responsive to the authentication between the first data processor and the second data processor, interchange the second data for mutual authentication to set the portable unit for the immobilizer unit in a way comprising: 1) the first data processor transmitting the second data for mutual authentication that is stored in the second storage via the first antenna and 2) the second data processor storing, into the third storage, the second data for mutual authentication received via the second antenna.

8. The vehicle antitheft system according to claim 7, wherein, upon input of a second instruction into the information reception part, when both of data stored in the second storage and the third storage are the second data for mutual authentication, either the first data processor generates and stores into the second storage first accumulation data different from the second data for mutual authentication, or the second data processor generates and stores into the third storage the first accumulation data; and
   when both of data stored in the second storage and the third storage are identical to the first data for mutual authentication, either the first data processor generates and stores into the second storage second accumulation data different from the first data for mutual authentication, or the second data processor generates and stores into the third storage second accumulation data different from the first data for mutual authentication.

9. The vehicle antitheft system according to claim 7, wherein, upon input of a second instruction into the information reception part, when both of data stored in the second storage and the third storage are the second data for mutual authentication, the first data processor transmits the first data for mutual authentication stored in the first storage via the first antenna, and the second data processor stores, into the third storage, the first data for mutual authentication received via the second antenna; and
   when both of data stored in the second storage and the third storage are identical to the first data for mutual authentication, either the first data processor generates and stores into the second storage second accumulation data different from the first data for mutual authentication, or the second data processor generates and stores into the third storage second accumulation data different from the first data for mutual authentication.

10. The vehicle antitheft system according to claim 7, wherein the portable unit further has a fifth storage preliminarily storing an ID code, and the first data processor and the second data processor authenticate each other also using the ID code.

11. The vehicle antitheft system according to claim 10, wherein the immobilizer unit further has a sixth storage, the second data processor transmits, via the second antenna, the ID code stored in the fifth storage, and the first data processor stores, into the sixth storage, the ID code received via the first antenna.

12. The vehicle antitheft system according to claim 11, wherein upon input of a second instruction into the information reception part, the first data processor generates third accumulation data different from the ID code stored in the sixth storage, and stores the third accumulation data into the sixth storage.

13. A vehicle antitheft system comprising:
   an immobilizer unit including:
      a first data processor
      a memory storing a first set of computer instructions;
      a first communication part connected with the first data processor;

a first antenna connected with the first communication part;

a first storage connected with the first data processor, the first storage preliminarily storing first data for mutual authentication; and a second storage connected with the first data processor; and the immobilizer unit further includes an information reception part connected with the first data processor; and a portable unit including:

a second data processor;

a memory storing a second set of computer instructions;

a second communication part connected with the second data processor;

a second antenna connected with the second communication part; and a third storage connected with the second data processor, the third storage preliminarily storing the first data for mutual authentication;

wherein the first data processor executes the first set of computer instructions and the second data processor executes the second set of computer instructions to perform the following functions comprising:

when a first instruction is fed into the information reception part, the first data processor and the second data processor authenticate each other by an authentication comprising: (1) the first data processor transmitting via the first antenna an encrypted data based on the first data for mutual authentication stored in the first storage and (2) the second data processor receiving the encrypted data via the second antenna, decrypting the encrypted data and comparing the decrypted data to the first data for mutual authentication stored in the third storage; and the first data processor and the second data processor, responsive to the authentication between the first data processor and the second data processor, interchange second data for mutual authentication to set the portable unit for the immobilizer unit in a way comprising: 1) the first data processor requesting the second data processor via the first antenna to generate the second data for mutual authentication which is different from the first data for mutual authentication, 2) responsive to the request from the first data processor, the second data processor further generating, storing into the third storage, and transmitting via the second antenna, the second data for mutual authentication, 3) the first data processor storing, into the second storage, the second data for mutual authentication received via the first antenna and transmitting the second data for mutual authentication stored in the second storage via the first antenna and 4) the second data processor further storing, into the third storage, the second data for mutual authentication received via the second antenna.

14. The vehicle antitheft system according to claim 13, wherein, upon input of a second instruction into the information reception part, when both of data stored in the second storage and the third storage are the second data for mutual authentication, either the first data processor generates and stores into the second storage first accumulation data different from the second data for mutual authentication, or the second data processor generates and stores into the third storage the first accumulation data; and when both of data stored in the second storage and the third storage are identical to the first data for mutual authentication, either the first data processor generates and stores into the second storage second accumulation data different from the first data for mutual authentication, or the second data processor generates and stores into the third storage second accumulation data different from the first data for mutual authentication.

15. The vehicle antitheft system according to claim 13, wherein, upon input of a second instruction into the information reception part, when both of data stored in the second storage and the third storage are the second data for mutual authentication, the first data processor transmits the first data for mutual authentication stored in the first storage via the first antenna, and the second data processor stores, into the third storage, the first data for mutual authentication received via the second antenna; and when both of data stored in the second storage and the third storage are identical to the first data for mutual authentication, either the first data processor generates and stores into the second storage second accumulation data different from the first data for mutual authentication, or the second data processor generates and stores into the third storage second accumulation data different from the first data for mutual authentication.

16. The vehicle antitheft system according to claim 13, wherein the portable unit further has a fifth storage preliminarily storing an ID code, and the first data processor and the second data processor authenticate each other also using the ID code.

17. The vehicle antitheft system according to claim 16, wherein the immobilizer unit further has a sixth storage, the second data processor transmits, via the second antenna, the ID code stored in the fifth storage, and the first data processor stores, into the sixth storage, the ID code received via the first antenna.

18. The vehicle antitheft system according to claim 17, wherein upon input of a second instruction into the information reception part, the first data processor generates third accumulation data different from the ID code stored in the sixth storage, and stores the third accumulation data into the sixth storage.

19. A vehicle antitheft system comprising:

an immobilizer unit including:

a first data processor;

a memory storing a first set of computer instructions;

a first communication part connected with the first data processor;

a first antenna connected with the first communication part;

a first storage connected with the first data processor, the first storage preliminarily storing first data for mutual authentication; and a second storage connected with the first data processor; and the immobilizer unit further includes an information reception part connected with the first data processor; and a portable unit including:

a second data processor;

a memory storing a second set of computer instructions;

a second communication part connected with the second data processor;

a second antenna connected with the second communication part; and a third storage connected with the second data processor, the third storage preliminarily storing the first data for mutual authentication;

wherein the first data processor executes the first set of computer instructions and the second data processor executes the second set of computer instructions to perform the following functions comprising:

when a first instruction is fed into the information reception part, the first data processor and the second data processor authenticate each other by an authentication comprising: (1) the first data processor transmitting via the first antenna an encrypted data based on the first data for mutual authentication stored in the first storage and (2) the second data processor receiving the encrypted data via the second antenna, decrypting the encrypted data and comparing the decrypted data to the first data for mutual authentication stored in the third storage; and the first data processor and the second data processor, responsive to the authentication between the first data processor and the second data processor, interchange second data for mutual authentication to set the portable unit for the immobilizer unit in a way comprising: 1) the first data processor generating, storing into the second storage, and transmitting via the first antenna, the second data for mutual authentication which is different from the first data for mutual authentication and 2) the second data processor storing, into the third storage, the second data for mutual authentication received via the second antenna.

20. The vehicle antitheft system according to claim 19, wherein, upon input of a second instruction into the information reception part, when both of data stored in the second storage and the third storage are the second data for mutual authentication, either the first data processor generates and stores into the second storage first accumulation data different from the second data for mutual authentication, or the second data processor generates and stores into the third storage the first accumulation data; and when both of data stored in the second storage and the third storage are identical to the first data for mutual authentication, either the first data processor generates and stores into the second storage second accumulation data different from the first data for mutual authentication, or the second data processor generates and stores into the third storage second accumulation data different from the first data for mutual authentication.

21. The vehicle antitheft system according to claim 19, wherein, upon input of a second instruction into the information reception part, when both of data stored in the second storage and the third storage are the second data for mutual authentication, the first data processor transmits the first data for mutual authentication stored in the first storage via the first antenna, and the second data processor stores, into the third storage, the first data for mutual authentication received via the second antenna; and when both of data stored in the second storage and the third storage are identical to the first data for mutual authentication, either the first data processor generates and stores into the second storage second accumulation data different from the first data for mutual authentication, or the second data processor generates and stores into the third storage second accumulation data different from the first data for mutual authentication.

22. The vehicle antitheft system according to claim 19, wherein the portable unit further has a fifth storage preliminarily storing an ID code, and the first data processor and the second data processor authenticate each other also using the ID code.

23. The vehicle antitheft system according to claim 22, wherein the immobilizer unit further has a sixth storage, the second data processor transmits, via the second antenna, the ID code stored in the fifth storage, and the first data processor stores, into the sixth storage, the ID code received via the first antenna.

24. The vehicle antitheft system according to claim 23, wherein upon input of a second instruction into the information reception part, the first data processor generates third accumulation data different from the ID code stored in the sixth storage, and stores the third accumulation data into the sixth storage.

* * * * *